United States Patent [19]

McQuinn

[11] 4,036,083

[45] July 19, 1977

[54] DRIVE ENGAGEMENT PRESSURE CONTROL BY TRIMMER BIAS CONTROL

[75] Inventor: Ted M. McQuinn, Carmel, Ind.

[73] Assignee: General Motors Corporation, Detroit, Mich.

[21] Appl. No.: 501,247

[22] Filed: Aug. 28, 1974

[51] Int. Cl.² ............................................. B60K 41/18
[52] U.S. Cl. ........................................ 74/867; 74/865
[58] Field of Search .................. 74/864, 867, 868, 869, 74/731, 752 C

[56] References Cited

U.S. PATENT DOCUMENTS

| | | | |
|---|---|---|---|
| 3,159,051 | 12/1964 | Herndon et al. | 74/864 X |
| 3,691,872 | 9/1972 | Schaefer et al. | 74/864 |
| 3,754,483 | 8/1973 | Edmunds | 74/868 X |
| 3,800,629 | 4/1974 | Lentz | 74/864 X |
| 3,818,783 | 6/1974 | Norris et al. | 74/864 X |

OTHER PUBLICATIONS

Partial Diagram of Lentz' (3,800,629) Trimmer Control System.

*Primary Examiner*—Allan D. Hermann
*Assistant Examiner*—Lance W. Chandler
*Attorney, Agent, or Firm*—A. M. Heiter

[57] ABSTRACT

A transmission having selectively engaged fluid actuated friction drive establishing devices and an engagement timing control system having a trimmer regulator valve for each drive establishing device, a trimmer bias regulator valve and accumulator. The oncoming trimmer valve has a spring biasing device responsive to engagement pressure to increase oncoming ratio drive engagement pressure at a controlled rate, initially at a high rate up to a minimum slack take up pressure, then to gradually increase the drive pressure from the minimum pressure at a low rate in a predetermined trimming time period for establishing the drive and then to increase the pressure at a very high rate to high line pressure. A trimmer bias system pressure is supplied to a bias chamber of the trimmer valves and acts in the oncoming trimmer valve bias chamber to increase the pressure level of the gradually increasing drive engagement pressure proportional to torque demand. A limited volume flow trimmer bias supply pressure is supplied to the trimmer bias system having an accumulator and the trimmer valve bias chambers which change volume during a shift relative to the limited volume supply flow to control the trimmer bias system pressure and the resulting drive ratio pressure so the engagement pressure is reduced to the minimum at the beginning of the trimmer time period at all torque demand values and the increase with torque demand is delayed and gradual for smooth shifting.

5 Claims, 2 Drawing Figures

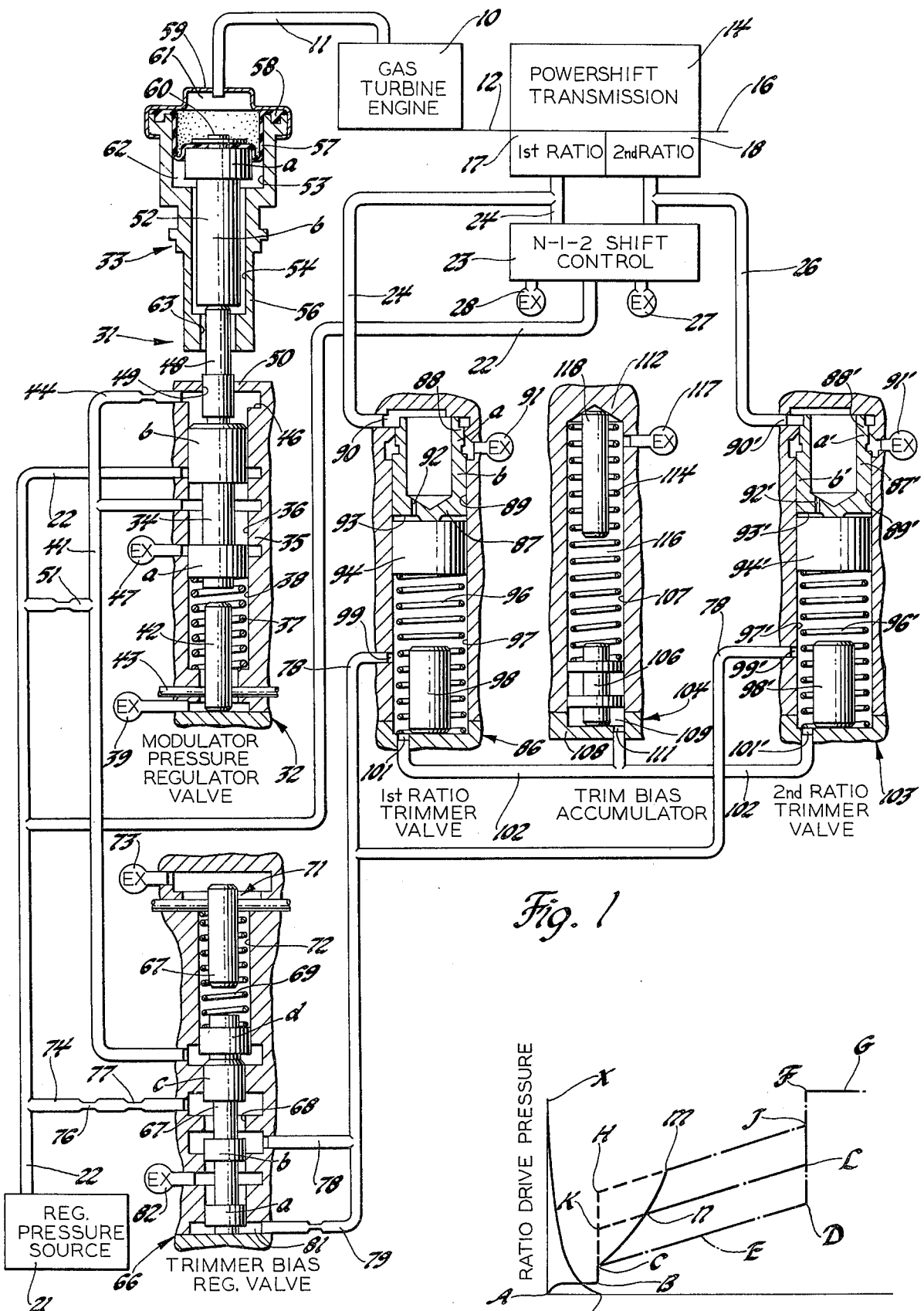

DRIVE ENGAGEMENT PRESSURE CONTROL BY TRIMMER BIAS CONTROL

This invention relates to transmissions with friction drive engagement control systems and more particularly to a time controlled engagement pressure schedule related to a disengagement schedule.

Prior Art

Transmissions having engagement control valves, or trimmer valves as they are commonly termed, which provide a substantially constant rate of pressure increase relative to time and also increased with torque demand for engaging a friction device, such as a clutch or brake, are known in the Schaefer et al. U.S. Pat. No. 3,691,872 patented Sept. 19, 1972. The Copeland U.S. Pat. No. 3,674,121 patented July 4, 1972 shows trimmer valves with a bias pressure controlled to control the gradual pressure rise in one phase.

SUMMARY OF THE INVENTION

This invention provides in a transmission having a fluid pressure operated friction device for establishing each ratio drive control system having an engagement pressure control system, including a trimmer regulator valve and a variable bias boost pressure system, providing a continuously progressively smoothly increasing engagement pressure schedule in higher pressure ranges with variations in bias pressure for smooth engagement of the oncoming friction device. The engagement pressure or trimmer regulated pressure schedule has initially a low slack take up pressure sufficient to take up slack and provide a very low torque slip drive in the oncoming friction device, then in response to termination of slack take up movement when this friction device has light slipping contact the pressure rises without time delay to a minimum trimmer regulated value. Then the trimmer pressure is regulated at gradually increased values, normally a straight line low rate increase with time, responsive to the trimmer regulated pressure during a predetermined trimming time period to gradually provide increasing torque slip drive and then non slip drive at an intermediate trimmer regulated pressure during the trimming time period to establish the drive. Then high main line regulated pressure as trimmer regulation ceases for maintaining the established drive. The bias boost pressure increases with increasing torque demand, such as compressor discharge pressure, and functions to increase the trimmer regulated pressure in the range between minimum and maximum values proportional to torque demand. It is important that as the trimmer controlled pressure increases from the minimum trimmer regulated pressure particularly at high torque demand providing high trimmer regulated pressure that the actual pressure does not momentarily overshoot the proper trimmer regulated pressure, commonly called a "spike" with reference to the pressure curve, causing a shock in the drive train. Thus the torque demand responsive pressure increase of trimmer regulated pressure is at a controlled intermediate rate relative to the low time rate increase.

The bias pressure supply for the bias pressure system has a limited volume supply relative to time, a limited volume flow rate, having when the limited volume flow rate is greater than the volume flow rate requirements, pressure valves increasing with increasing torque demand from idle to full torque demand supplied to the bias system having a trimmer regulator valve bias chamber and an accumulator. As the trimmer regulated pressure reaches the minimum regulated value at each torque demand value, the bias chamber of the trimmer valve begins to diminish in volume relative to time and the accumulator volume will increase with increasing bias pressure so that with the limited volume supply of bias supply pressure, the bias system pressure is reduced and increased at a moderate rate in a time delay period so it does not exceed manual torque demand and thus the trimmer regulated pressure is a minimum at the beginning of the trimming period at all torque demand values and increased at a moderate or intermediate rate so it cannot increase above the manually controlled scheduled regulated value to cause excessive shift shock.

This invention is especially useful to prevent shift shock on manual and automatic upshifts and downshifts between one oncoming ratio drive and another offgoing ratio drive where each ratio drive has a fluid pressure engaged friction device and a trimmer valve having an engagement pressure regulator valve and a biasing control with a controlled spring bias device and a bias boost chamber. A bias boost pressure system has, when the limited volume bias boost pressure supply exceeds flow requirements, increasing pressure with increasing torque demand. The bias pressure system includes an accumulator connected to both bias chambers. In this shift system on a ratio shift with higher than idle torque demand and thus higher than minimum idle bias supply pressure, the offgoing friction drive device is exhausted to cause the offgoing trimmer valve to reset and rapidly increase the volume of its bias boost chamber as the oncoming bias boost chamber slowly decreases volume and the accumulator is discharged decreasing volume to provide in the bias system a net time rate of volume increases greater than the time rate of volume of fluid supplied by the limited volume bias pressure supply so the bias pressure is reduced to the minimum value when the oncoming friction drive device reaches the end of the slack take up movement and the oncoming trimmer regulator valve initially regulates the apply pressure at the minimum value regardless of torque demand. Then at a time rate the volume increase of the offgoing bias chamber is decreased and terminated, the volume of the accumulator is increased and the volume of the oncoming bias chamber continues to slowly decrease to provide a net continued time rate of increasing volume of the bias boost pressure system becoming or approaching slightly less than the volume time rate of fluid supplied by the limited volume supply bias pressure supply so the bias system pressure and thus the trimmer regulated pressure gradually increase at an intermediate moderate time rate higher than the low rate trimming pressure increase to gradually increase the trimmed pressure from the minimum value at the intermediate time rate proportional to torque demand to higher pressure levels where the pressure increases at the trimmer pressure responsive low rate of pressure increase to a maximum value at full torque demand.

These and other features of the invention will be apparent from the following description and drawings of the preferred embodiment.

FIG. 1 schematically shows the power train having an engine and power shift transmission and the transmission controls.

FIG. 2 shows a plot of ratio drive pressure relative to time.

The power train has a known gas turbine engine 10 providing a compressor discharge pressure signal, a torque demand signal, in torque demand signal line 11 and output power to the input shaft 12 of the power shift transmission 14 which drives load shaft 16. The known power shift transmission, which may specifically be as shown in Schaefer et al. U.S. Pat. No. 3,691,872 patented Sept. 19, 1972, has fluid actuated friction clutches or brakes for establishing each ratio drive or fluid actuated friction drive establishing devices for establishing each drive. Each such device has a fluid actuator or motor operative when supplied with fluid under pressure to engage friction means to establish a drive and retraction spring means operative on exhaust of fluid from the fluid actuator to disengage the friction device. A first ratio device 17 and a second ratio device 18 are shown.

The transmission control system has a regulated pressure source 21, normally provided by a pump and a regulator valve, which delivers fluid from a sump at main line regulated pressure to main line 22. The main line 22 is selectively connected to the ratio drive devices to establish the ratio drives by the N-1-2 shift control 23, which may be a known manual or automatic type shift valve. An example of a manual shift control employing a manual valve is shown in the Tuck U.S. Pat. No. 2,853,891 patented Sept. 30, 1958. An example of an automatic shift control employing manual and automatic shift valves is shown in Schaefer et al. U.S. Pat. No. 3,691,872 patented Sept. 19, 1972.

In such systems the shift control in neutral position blocks the main line 22 and connects respectively the first and second ratio devices 17 and 18 by lines 24 and 26 to exhausts 28 and 27, in first ratio position connects main line 22 to first ratio apply line 24 while the second ratio apply line 26 is connected to exhaust 27 to engage the first oncoming ratio device 17 to establish first ratio drive and disengage the second offgoing ratio device 18 and in second ratio position to connect main line 22 to the second ratio apply line 26 while the first ratio apply line 24 is connected to exhaust 28 to engage the second oncoming ratio device 18 to establish second ratio drive and disengage the first offgoing ratio device 17. This invention applies to shift systems in which fluid is supplied to the drive engaging device and fluid is exhausted from the drive disengaging device.

MODULATOR PRESSURE REGULATOR

The modulator pressure regulator 31 or torque demand means provides a pressure or signal inversely proportional to compressor discharge pressure or torque demand and has a modulator pressure regulator valve 32 and a compressor discharge pressure actuator 33. The modulator pressure regulator valve 32 has a valve element 34 having equal diameter lands $a$ and $b$ mounted in a bore 36 in valve body 35. The spring 37, located in a spring chamber 38 portion of the bore vented by exhaust 39, biases the valve element to the open position connecting main line 22 between the lands to the modulated signal line 41. Stop pin 42 secured by pin fastener 43 to valve body 35 limits opening valve element movement and guides the spring 37. The modulated signal line 41 is connected by a restricted branch 44 to the bias chamber 46 at the closed end of bore 36 to act on the end of land $b$ to bias the valve element to connect modulator line 41 between lands $a$ and $b$ to exhaust 47. Force pin 48 slides in and seals aperture 49 in bore end wall 50 and transmits the compressor discharge pressure actuator force to valve element 34 to regulate the modulated signal pressure inversely proportional to torque demand on the engine or the force delivered by the compressor discharge pressure actuator 33. Main line 22 and modulated pressure line 41 are connected by restricted passage 51 to improve regulation.

The modulator pressure regulator valve 32 is controlled by a compressor discharge pressure actuator 33 having a stepped piston 52 having a large diameter land $a$ and small diameter guide land $b$ respectively mounted in the large diameter bore portion 53 and small diameter bore portion 54 in the actuator housing 56 fixed relative to the valve body 35. The piston land $52b$ has a large clearance in bore portion 53 to accommodate roll diaphragm 57 which is adhesively bonded to the end face of land $52a$ and sealed to the end face of housing 56 by seal 58 and secured by the crimped on end wall 59 which defines a chamber 61 between the end wall and diaphragm. The button and washer 60 on the end of piston land $52a$ locates the diaphragm 57 for adhesively securing the diaphragm and may limit piston movement so the diaphragm does engage end wall 59 and anchors a washer to mechanically further secure the diaphragm. The compressor discharge pressure line 11 is connected from the engine compressor discharge chamber to pressure chamber 61. The piston land $52b$ is slidably mounted in small bore portion 54 for guiding the piston but with sufficient clearance so chamber 62 is always exhausted through bore 54 and aperture 63. The piston 52 and roll diaphragm 57 have free movement throughout the regulating movement of valve element 34. The force of the actuator 33 is proportional to the compressor discharge pressure and thus increases with increasing torque demand and acts through piston 52 and force pin 58 on the valve element 34 in the same direction as the force of the regulated pressure in chamber 46 so both forces oppose the valve spring force to provide a regulated pressure inversely proportional to actuator force, torque demand or compressor discharge pressure. Due to the reaction of modulator pressure in chamber 46 on force pin 48 and the spring force value relative to the compressor discharge force value provided by the actuator 33, the modulator 33, the modulator pressure has a constant maximum value at close to zero torque demand or minimum compressor discharge pressure and a constant zero value at close to maximum torque demand. These constant maximum and zero values of modulator pressure extend over a very small portion of the torque demand range and are merely sufficient to accurately determine these values notwithstanding small tolerance variations in these controls and between these values modulator pressure varies inversely relative to torque demand.

TRIMMER BOOST REGULATOR VALVE

The trimmer bias regulator valve 66, a bias fluid supply means or bias signal means has a valve element 67 having equal diameter lands $a$, $b$, $c$ and larger land $d$ located in a stepped bore 68 and is biased to the feed position shown by a spring 69 seated on an abutment and stop pin assembly 71 located and fixed in a spring chamber 72 vented by exhaust 73. The feed to the trimmer bias regulator valve 66 is through the double restricted main line branch 74 having a first or upstream restriction 76 and a second downstream restriction 77 called volume flow rate means, to accurately provide a constant limited volume of flow per unit of time or a constant limited volume rate of flow of main line fluid from the main line to this valve and provides not more than the same limited volume rate of supply flow of the trimmer fluid, unregulated when flow requirements are not met and regulated when flow requirements are met, to supply pressure in line 78 to control chambers of the trimmer valves 86 and 103 and accumulator 104. As described below, the bias pressure line 78 and control chambers of the trimmer valves and accumulator are openly connected to form a variable volume bias pressure system and only accepts flow with increasing volume and to replace leakage. When the volume rate of flow requirements of the variable bias pressure system are less than this limited volume rate of supply flow, the volume rate of supply flow in main line branch 74 and trimmer bias regulated pressure line are reduced to merely supply such requirements. With the valve element 67 in the feed position shown, main line branch 74 is connected between the lands b and c to the trimmer bias regulated pressure line 78 which is connected by restricted branch 79 to the closed bias chamber 81 in the end of the bore to act on the end of land a and oppose the spring bias to regulate the pressure. When the trimmer bias pressure tends to be less than the torque demand regulated value, the constant limited flow supply from main line branch 74 is connected through trimmer bias regulator valve 66 to bias pressure line 78 to provide fluid supply up to the constant limited volume flow. When the trimmer bias pressure tends to exceed the torque demand regulated value, it will move the valve element 67 to exhaust position connecting trimmer bias pressure line 78 between lands a and b to exhaust 82, an unrestricted or open passage. The modulator pressure line 41 is connected to the step between the large and small bore portions and between the lands c and d to act on the unbalanced area of land d opposing the spring. Increasing modulator pressure in line 41 provides a proportionately reduced trimmer regulator or bias pressure. Since modulator pressure varies inversely with torque demand and is a maximum at idle and reduces to zero at a high throttle position, the trimmer bias regulator pressure or biasing signal is low at idle, low torque demand values, and increases directly proportionately to increasing torque demand to a maximum torque demand where the highest trimmer bias regulator pressure is determined by the spring force and the area of land a of trimmer bias regulator valve element 67. Thus the flow control restrictions 76 and 77 and bias regulator valve 66, the bias fluid supply having flow-limiting means and regulating means, provide up to a predetermined limited volume rate fluid supply to the bias pressure system. When the bias pressure system volume increases at a high rate and thus has volume flow-rate requirements greater than the limited volume rate of the supply, bias system pressure is minimum or zero at all torque demand values. When the bias pressure system volume increases at an intermediate rate approaching slightly less than the limited volume flow rate, as the accumulator is progressively charged, bias system pressure will, at higher to full torque demand values, progressively increase to higher bias system pressures regulated in proportion to torque demand. When bias pressure system volume increases at a low rate less than the limited volume rate of bias supply flow, the regulator valve 66 regulates bias system pressure proportional to torque demand.

TRIMMER VALVES

The first ratio drive trimmer valve 86 has a trimmer regulator valve element 87 having a small land a and large land b located respectively in small bore 88 and large bore 89. The first ratio drive apply line 24 is connected by port 90 to the closed end of the bore 88 and acts on the area of land a to bias the valve element to the open position connecting first ratio drive apply line 24 to exhaust 91 to reduce the first drive engagement pressure. First ratio drive engagement pressure from line 24 is also continuously connected through valve element 87 by restriction 92 to the space or chamber 93 between the regulating valve element 87 and an actuator bias plug 94 which is shown in the minimum pressure regulating position biased by biasing means, the spring 96 located in fluid bias chamber 97 and bias boost pressure in fluid biasing chamber 97. The plug 94 moves in bore 89 through a range of higher trimmer pressure regulating position until it engages stop member 98. The trimmer bias pressure line 78 is connected to chamber 97 at a port 99 below the stop and thus never blocked by plug 94. When first ratio apply line 24 is exhausted, spring 96 moves the plug 94 at a high rate in a short reset time period to engage and position the regulator valve element 87 in the closed position shown. This reset valve movement decreases the volume of the chamber 93 and increases the volume of the bias chamber at a high rate in the short reset time period. On the initial supply of fluid to the first ratio device by first apply line 24, pressure acts on regulator valve element 87 and after the slack take up period is regulated at a low minimum pressure value determined by the minimum spring force at full spring height with the valve element 87 and plug 94 in contact in the valve assembly. At the same time fluid slowly flows through restriction 92 to fill and enlarge the space 93 to gradually separate the regulator valve element and plug so that the spring 96 is more and more compressed to gradually increase the regulated pressure at a low trimming rate determined by the restriction and spring rate until a low intermediate regulated pressure is provided with the plug engaging stop 98 by this timed bias means. Then the pressure quickly increases to main line pressure. This regulated trimmer or engagement pressure is also increased by bias system pressure increased with increasing torque demand under the control of the bias pressure system as explained below up to a maximum pressure at the end of the long trimming time period at full torque demand. The valve will remain in this position until the first apply line 24 is exhausted and the valve will return or reset quickly to the initial position shown. The use of trimmer regulator pressure valves makes it possible to individually set the low pressure and rate of pressure rise and to increase these pressures with increasing torque demand to meet the requirements of each friction device with the same basic valve structure. The calibration may be varied by changing spring and stop members. The fluid biasing chamber 97 is also openly connected by port 101 to accumulator line 102.

The second ratio trimmer valve 103 is identical or similar and thus the above description applies with reference to the same reference numbers primed. The second ratio drive apply line 26 is connected to the port 90', the trimmer regulated bias system pressure line 78 is connected to port 99' and the accumulator port 101' is connected to accumulator line 102.

ACCUMULATOR

The trimmer bias accumulator 104 has a piston 106 having sealing lands slidably sealed in bore 107. The bore 107 has an end closure 108 providing between the end closure and piston 106 an expansible chamber 109 connected by port 111 to accumulator line 102. The opposite end of the bore 107 has an abutment end 112 for spring 114 which engages and biases piston 106 to engage end wall 108, the minimum volume position of expansible chamber 109. The spring chamber 116 in the bore 107 between the piston 106 and abutment 112 is vented by exhaust 117. A stop pin 118 within the spring 114 limits piston movement as a stop position beyond the normal range so a malfunction will not break the spring. Maximum boost pressure, i.e., 30 psi, moves the piston to the maximum volume or charged position, about three fourths the distance from the discharge position to the stop position. The spring has about zero force at minimum volume position as the bias supply and system pressure is zero at idle torque demand and maximum force at maximum volume position so trimmer bias regulated pressure of a maximum value at maximum torque demand is required to move the piston 106 to maximum volume position.

OPERATION

The above described basic individual operating characteristics of each of the components have the following relative pressure regulation characteristics changing in relation to time in order to cooperate to provide the ratio drive pressure changes in relation to time shown in FIG. 2 plot for smoothly establishing the ratio drives.

In all phases of operation the regulated pressure source provides a high main line pressure i.e., 100 psi, the modulator pressure regulator valve provides modulator pressure varying, i.e., 50 to 0 psi, inversely with compressor discharge pressure and torque demand from idle to full throttle and the trimmer bias regulator valve 66 provides trimmer bias boost pressure varying, 0 to 30 psi, inversely with modulator pressure and directly with increasing compressor discharge pressure from idle to full throttle or from idle to full torque demand.

In neutral position of the N-1-2 shift control 23 the first ratio drive device 17 through first apply line 24 is connected to exhaust 28 and the second ratio drive device 18 through second apply line 26 is connected to exhaust 27 to establish positive neutral. The first and second apply lines 24 and 26 are exhausted so the respective first and second trimmer valves 86 and 103 are held in the initial or reset position shown by their respective springs 96 and 96'. At idle throttle, normal in neutral, the accumulator piston is in the discharged position shown. There is sufficient flow restriction between the regulated pressure source 21 and the connection of the trimmer valves 86 and 103 and friction means for first and second ratio devices 17 and 18, , during fluid supply for their engagement so the trimmer valves can regulate pressure by exhausting. This flow restriction is normally provided by the normal flow restriction of main line 22 and shift valve 23 and, if needed, a restriction in line 22.

When the shift control 23 is moved from neutral to first position, normally at idle throttle, main line 22 is connected to first apply line 24 to supply pressure under the control of the first oncoming trimmer valve 86 to the first oncoming ratio drive device 17 to establish first ratio drive. In the slack take up phase, the initial pressure rise from A to B is quick and sufficient to take up the slack in the first ratio friction drive device to overcome the retraction springs for initial light slipping contact engagement and then the first apply pressure very quickly rises from B up to C. The minimum trimmed engagement pressure C acts on regulator valve element 87 overcomes spring 96 and begins to regulate first apply pressure at the value C, a light slipping contact insufficient for drive or providing full slip at minimum normal torque load. At the same time first apply pressure flows through restriction 92 to chamber 93 to move or stroke the plug 94 toward stop 98 to gradually increase first oncoming engagement pressure at a low trimming rate in a long trimming time period on curve C-D. At some intermediate pressure during the trimming time period non slip drive is obtained, increasing pressure being required with increasing near minimum load, so a non slip drive at a mean normal rear minimum load would be obtained at a mean pressure E. The plug 94 at the end of the stroke engages stop 98 at the maximum idle throttle pressure, a low intermediate pressure, point D of the gradually rising idle throttle pressure curve C-D and then very quickly rises on curve D-F to main line pressure at F and remains at main line pressure F-G thereafter to insure non slip drive regardless of load change.

The above minimum pressure schedule ACDFG occurs at idle throttle or torque demand to prevent excessive slip and to insure non sip engagement on a gradually rising pressure curve for smooth drive establishment and is increased in a controlled relation with increasing throttle. The constant limited volume supply pressure regulated by bias regulator valve 66 is supplied by line 78 to a variable volume bias pressure system including openly interconnected bias chambers 97 and 97' and accumulator 104, which varies in volume to modify bias supply pressure and provide bias system acting in chamber 97 to assist spring 96 bias the plug 94 and trimmer regulating element 87 to proportionally increase engagement pressure. The bias pressure varies from a low value to a high value, i.e., 0 to 30 psi, with increasing compressor discharge pressure from idle to full throttle or torque demand and increases the trimmed first engagement pressure from the gradually increasing with time idle torque demand range, i.e., C-D to the gradually increasing with time full torque demand range, i.e., H-J. This increase of trimmed engagement pressure is proportional to torque demand and thus trimmed first engagement pressure increases at similar intermediate gradually increasing pressure ranges K-L at intermediate torque demand values. These gradually increasing engagement pressures are at the same low rate over the same long trimming time period provided by the timed spring biasing means, restriction 92, chamber 93, plug 94 and spring 96. The operator can slowly advance the throttle to avoid a sudded pressure rise CH or quickly advance the throttle for a less smooth high performance shift. On this neutral to first shift the second trimmer valve bias chamber 97' has a constant volume, the accumulator 104 increases in volume to compensate for the decreasing volume of the first trimmer valve bias chamber 97 and the limited volume flow trimmer bias pressure supply provided by the restricted supply 74 and bias regulator valve 66 accommodates for the reducing volume of boost bias chamber 97 to insure a smooth rise of trimmed first apply pressure without spikes responsive to the manual throttle advance during a shift. The restricted supply of bias pressure has a sufficiently low rate of flow of volume per unit of time that the stroking of the accumulator during a bias pressure rise will accept a sufficient volume of fluid to compensate or overcompensate for the reduction of volume in chamber 97 during the stroking of the plug 94 during a trim cycle so the trimmed first apply pressure on a neutral to first shift smoothly follows or is slightly delayed relative to the manual throttle or torque demand control provided by compressor discharge pressure from C to a point on curve HJ depending on the speed of manual throttle advance.

On a shift from first to second ratio drive the shift control connects the first apply line 24 to exhaust 28 to disestablish offgoing first ratio device 17 and connects main line 22 to a second apply line 26 to establish oncoming second ratio device 18. When the transmission is in the first ratio drive, the first ratio trimmer valve 86 is in the stroked position with plug 94 engaging stop 98 and regulator valve element 87 blocking exhaust 91 so there is no reduction of main line pressure in first apply line 24, the second ratio trimmer valve is in the reset position shown and bias pressure is in respective bias chambers 97 and 97' and accumulator chamber 109 according to the instantaneous torque demand. As the bias system volume is constant in first ratio drive bias supply pressure and bias system pressure are the same. At idle throttle with minimum bias pressure on a first second shift, the second trimmer valve 103 will function like the first trimmer valve 86 as described above on a shift from neutral to first with the spring bias providing the idle trimmed pressure rise, curve A-B-C-D-F-G. On the first second shift, first engagement pressure quickly decreases (curve XY) below minimum bias pressure before the beginning of the trimming time period at full throttle and maximum bias supply pressure, so the spring and bias system pressure strokes plug 94 to the reset position increasing the volume of bias chamber 97 at a high time rate controlled by the spring 96, bias system pressure and the size of restriction 92 controlling discharge of fluid from chamber 93 to exhausted first apply line 24. The second trimmer valve plug 94' from the point of initial regulating, point C, gradually reduces the volume of bias chamber 97'. The accumulator piston 106 moves to discharge fluid from the chamber 109 to bias chambers 97 and 97'. Thus the volume of the bias pressure system is controlled by the rapid increase of the volume of first bias chamber 97 and the reduction of the volume of accumulator chamber 109 provides a net high increase of volume relative to time of the bias pressure system greater than the constant volume of flow relative to time supplied by the bias supply system to provide a reduction of bias system pressure to zero just before the beginning of the trimming time period so a minimum initial second clutch engagement pressure value, point C, is provided at all torque demand values. Then as the first bias plug 94 moves toward the reset position and reaches the reset position, the increase in volume of bias chamber 93 is slowed and stopped, the second bias plug 94' reduces the volume of second bias chamber 97' and the accumulator piston 106 is stroked by bias system pressure to increase the volume of accumulator chamber 109 to provide a net increase of bias system volume at a rate approaching slightly less than the bias supply limited volume flow rate to cause a slow delayed change of bias system pressure in the bias chamber 97' similar to and causing the slow intermediate rate rise in trimmed engagement pressure from the idle torque demand initial minimum trim pressure point C, to the higher or full torque demand high intermediate trim bias and engagement pressure after a substantial time delay, curve point N or M. After the accumulator stroke is terminated or completed at higher to full torque demand, the bias system volume decreases so the rate of increase is less than the limited volume flow rate, and bias system pressure is regulated by torque demands, so gradual pressure rise, N-L or M-J, is provided by the spring biasing means. As the trimmed pressure rises on curve C-M-J the pressure will reach a maximum engagement value, J. to provide non slip drive at full throttle torque. The time delay of the delayed intermediate rate pressure rise from C to M on the curve, is about one third to one half the time of the gradual pressure rise, the trimming time period due to the stroking of the second trimmer valve 103.

When the plug 94' engages stop 98' of the second trimmer valve 103 the gradual pressure rise terminates, point J, and at that time rises to line pressure, point F, and remains at line pressure, curve F-G. At mean throttle or torque demand values the systems function similarly to provide a mean pressure increase curve A-B-C-N-L-J-F-G. On a shift from second ratio drive to first ratio drive the shift control 23 connects the second apply line 26 to exhaust 27 and connects main line 22 to first apply line 24. The second trimmer valve 103 is exhausted and increases the volume of the chamber 97' portion of the bias pressure system to function like the first trimmer valve 86 on the first second shift described above. The first trimmer valve 86 on a second first shift, functions like the second trimmer valve 103 on a first second shift, in cooperation with the constant limited bias pressure supply, the accumulator 104 and second trimmer valve to provide the same idle throttle trimmed pressure increase, curve A-B-C-D-F-G and the same full throttle trimmed pressure increase, curve A-B-C-M-J-F-G.

The invention includes the above described preferred embodiment and other modifications will be apparent to those skilled in the art.

It is claimed:

1. In a drive and drive engagement control: fluid pressure engaged drive establishing friction means operative in response to engagement pressure for engaging to establish a drive; a source of fluid pressure; drive control means selectively supplying fluid engagement from said source to said friction means for establishing a drive; torque demand means providing a torque demand signal proportional to torque demand from idle to full torque demand; bias signal means operatively connected to said torque demand means and being controlled to provide a biasing signal having an increasing value from a minimum value to a maximum value proportional to torque demand from idle to full torque demand, to provide substantially said minimum value at all torque demand values and to increase from substantially said minimum value to said increasing value; trimmer regulator valve means connected to said friction means and having biasing means connected to said bias signal means and operative in response to the supply of engagement pressure to said friction means for controlling the engagement pressure in said friction means to provide, at idle torque demand, the minimum value biasing signal acting on said biasing means, and an initial minimum value engagement pressure permitting slip at minimum idle drive torque and the engagement pressure increasing at a low rate relative to time over a predetermined trimming time period to an intermediate engagement pressure value providing non-slip drive at maximum idle drive torque and at higher to full torque demand initially controlling said bias signal means to provide substantially said minimum value biasing signal providing substantially said same initial minimum value engagement pressure at all torque demand values and progressively increasing said biasing signal value and the engagement pressure value at a higher rate relative to time and to higher values proportional to higher to full torque demand in a significant large initial portion of said time period and then from said higher values increasing engagement pressure substantially at said same low rate to a maximum engagement pressure proportional to higher to full torque demand providing non-slip drive at higher to full drive torque.

2. A multi-ratio transmission having a plurality of fluid pressure engaged drive establishing friction means each operating as an on-coming drive establishing means in response to increasing engaging pressure for slipping and then non-slipping drive at pressure levels increasing with increasing drive torque for establishing a drive and as an off-going drive establishing means in response to exhaust of engaging pressure to dis-establish the drive; a source of fluid pressure; torque demand means providing a torque demand signal proportional to torque demand from low to full torque demand; bias signal means operatively connected to said torque demand means and being controlled to provide a biasing signal having increasing values from a low value to a full value from low to full torque demand, to provide substantially said low value at all torque demand values and to increase from substantially said low value to said increasing values; shift control means for selectively connecting said source to supply engaging pressure to one on-coming friction means and to connect another off-going friction means to exhaust; one and another trimmed regulator valve means connected respectively to and regulating the engaging pressure supplied to said one and another friction means; one and another biasing means connected respectively to said one and another trimmer regulator valve means and both connected to said bias signal means operative on the supply of engaging pressure to said one on-coming friction means and the exhaust of engaging pressure from said another off-going friction means by said shift control means to control said one regulator valve means and said one and another biasing means for controlling said bias signal means to control the engaging pressure in said on-coming friction means to initially rise to take up slack and permit slip and then at low torque demand to control said bias signal means to provide said low value biasing signal to provide a low value engaging pressure and to then increasing engaging pressure from said low value at a low rate with time during a predetermined trimming time period to provide at low torque slipping and then non-slipping drive of said one on-coming friction means and operative at higher to full torque demand for initially controlling said bias signal means to provide substantially said low value biasing signal and substantially said low value engaging pressure and then controlling said bias signal means for increasing said biasing signal from substantially said low value and said engaging pressure from substantially said low value at a higher rate with time over a significantly large initial portion of said predetermined trimming time period up to a higher to said full value biasing pressure and high to higher value engaging pressure in proportion to said higher to full torque demand and then increasing from said high to higher value engaging pressure at said low rate with time to high maximum to a higher maximum pressure level to provide at high to higher torque slipping and then non-slipping drive of said one on-coming friction means.

3. A multi-radio transmission having a plurality of fluid pressure engaged drive establishing friction means each operating as an on-coming drive establishing means in response to increasing engagement pressure for slipping and then non-slipping drive at pressure levels increasing with increasing drive torque for establishing a drive and as an offgoing drive establishing means in response to exhaust of engagement pressure to dis-establish the drive; a source of fluid regulated at a high source pressure; shift control means connected to said source and said plurality of friction means operative to selectively connect said high source pressure to supply one on-coming friction means to establish one drive and to exhaust another off-going friction means to dis-establish another drive; bias fluid supply means supplying up to a predetermined constant limited volume rate of flow of bias supply fluid at substantially zero idle pressure when the volume flow rate reqirements are greater than said limited volume flow rate and at a torque demand regulated bias pressure increasing from idle to full pressure with increasing torque demand from idle to full torque demand when the volume flow rate requirements are less than said limited volume rate of flow; a trimmer valve means for each friction means; each trimmer valve means having regulator valve means connected to a friction means to regulate the engagement pressure of the on-coming friction means and bias control means having timed bias means and variable volume bias chamber means connected to said on-coming regulator valve means to control the engagement pressure in a schedule and to reset the off-going regulator valve means in response to exhaust of an off-going friction means; variable volume bias pressure system means openly interconnecting and including both bias chamber means openly connected to said bias fluid supply means and supplied with bias supply fluid and having bias system pressure of substantially zero for said one on-coming trimmer valve means when the other off-going trimmer valve means is being reset and providing bias pressure system means volume increasing at a high volume rate greater and thus having volume flow rate requirements greater than said limited volume rate of flow, bias system pressure gradually progressively increasing at a low intermediate rate during a time delay period proportional to the pressure increase to equal regulated bias pressure during the trimming time period for said one on-coming trimmer valve means when the other off-going trimmer valve means has lower rate reset movement and provides bias system pressure means volume increasing at an intermediate rate approaching slightly less than, so volume flow rate requirements are approaching slightly less than, said limited volume rate of flow and bias system pressure equal to said torque demand regulated bias pressure when the bias system volume rate increase is less than said limited volume flow rate; the on-coming trimmer valve means for the on-coming friction means has its regulator valve means controlled by its said bias control means operative in response to the initial supply of source pressure fluid by said shift control means to the on-coming friction means for supply in the slack take-up phase up to the minimum engagement pressure and regulation in the engagement phase to intitially provide, in response to said substantially zero bias system pressure, the minimum engagement pressure and at idle torque demand to increase engagement pressure at a low rate with time through said trimming time period up to a low intermediate pressure to provide near minimum torque non-slip drive during the low rate pressure increase; the off-going bias chamber means responsive to exhaust of the off-going friction means operative to reset in a short reset time period beginning during said slack take-up time period and terminating in a beginning portion of said engagement time period to increase bias system volume at said high volume rate to decrease said bias system pressure from any higher pressure to substantially zero pressure at the beginning of said engagement time period and acting on said on-coming bias chamber means to initially provide said minimum engagement pressure at all torque demand values and for controlling said bias system pressure by increasing bias system volume at said low intermediate rate to increase bias system pressure, at said intermediate rate during a time delay period over a significant portion of said trimming time period at full regulated bias pressure, acting in said on-coming bias chamber means to increase engagement pressure at a low intermediate rate in conjunction with said timed bias means operating to increase engagement pressure at said low rate to increase engagement pressure at an intermediate rate to higher intermediate pressures proportional to torque demand and at the end of said time delay period said bias system volume changing at said lower rate provides regulated bias pressure in said bias system means and said timed bias means increasing said engagement pressure from any said higher intermediate pressure at said low rate to higher values which at the end of the trimming time period and at full bias supply and system pressure provide maximum engagement pressure.

4. A multi-ratio transmission having a plurality of fluid pressure engaged drive establishing friction means each operating as an on-coming drive establishing means in response to increasing engagement pressure for slipping and then non-slipping drive at pressure levels increasing with increasing drive torque for establishing a drive and as an off-going drive establishing means in response to exhaust of engagement pressure to dis-establish the drive; a source of fluid regulated at a high source pressure; shift control means connected to said source and said plurality of friction means operative to selectively connect a fluid pressure supply to one on-coming friction means to establish a drive and to exhaust another off-going friction means to dis-establish a drive; bias fluid supply means supplying up to a predetermined constant limited volume rate of flow of bias supply pressure at substantially zero idle pressure when the volume flow rate requirements are greater than said limited volume flow rate and at a torque demand regulated bias supply pressure increasing from zero to full pressure with increasing torque demand from idle to full torque demand when flow rate requirements are less than said limited volume rate of flow; accumulator means being discharged at zero pressure and being partially to fully charged at higher to full bias supply pressures with a predetermined volume in a predetermined time period both increasing proportional to bias supply pressure; a trimmer valve means for each friction drive means; each trimmer valve means having regulator valve means connected to a friction means to regulate the engagement pressure of the on-coming friction means and bias control means connected to said regulator valve means to control the engagement pressure schedule, including a slack take-up pressure phase in a slack take-up period, an engagement pressure phase between a minimum engagement pressure providing full slip engagement at minimum drive torque and a maximum engagement pressure providing non-slip drive at maximum drive torque in a predetermined long trimming time period and then source pressure in an engaged phase, and said bias control means including bias spring means and variable volume bias chamber means; pressure system means openly interconnecting and including both bias chamber means and said accumulator means and openly supplied with bias supply fluid by said bias fluid supply means and having bias system pressure of zero regardless of torque demand when the bias system volume is increasing at a high rate providing volume flow rate requirements greater than said limited volume rate of flow and bias system pressure gradually increasing at a low intermediate rate during a time delay period proportional to the regulated bias supply pressure and at full bias supply pressure about one-third to one-half of the trimming time period to equal regulated bias supply pressure as the rate of increasing bias system volume is reduced to an intermediate rate approaching less than said limited volume rate of flow and bias system pressure equals regulated bias supply pressure when bias system volume rate of increase is less than said limited volume flow rate; the trimmer valve means for the on-coming friction means has the regulator valve means controlled by its bias control means controlled by its bias spring means operative in response to the initial supply of source pressure fluid by said control means to the on-coming friction means for regulation in the slack take-up phase up to the minimum engagement pressure and in the engagement phase to initially provide the minimum engagement pressure and to increase engagement pressure at a low rate with time through said trimming time period up to a low intermediate pressure to provide near minimum torque non-slip drive during the low rate pressure increase and to decrease the volume of its bias chamber means at a low trimming rate during said trimming time period and its bias chamber means increasing engagement pressure from said minimum to low intermediate pressures proportional to bias system pressure during the trimming time period; the off-going bias chamber means responsive to exhaust of the off-going friction means operative to increase the volume of said off-going bias chamber means at a high reset rate in a short reset time period beginning during said slack take-up time period and terminating in a beginning portion of said engagement time period to increase bias system volume at said high rate during accumulator means discharge to decrease said bias system pressure from any higher pressure to said zero idle pressure at the beginning of said engagement time period discharging said accumulator and acting on said on-coming bias chamber means to initially provide said minimum engagement pressure at all torque demand values; said accumulator increasing volume in proportion to increasing bias system pressure and said off-going bias chamber means increasing its volume at a decreasing reset rate and said on-coming bias chamber means decreasing its volume at said low trimmer rate for increasing the volume of said bias system means at said intermediate rate for controlling said bias system pressure to increase bias system pressure at an intermediate rate, during a time delay period about one-third to one-half of said trimming time period at full bias supply pressure and a reduced time delay at reduced bias supply pressures beginning when said bias supply pressure is increased or is high during said trimming time period, acting in said on-coming bias chamber means to increase engagement pressure at a low intermediate rate in conjunction with said bias spring means operating to increase engagement pressure at said low rate to increase engagement pressure at an intermediate rate to higher intermediate pressures proportional to bias supply pressure and at the end of said time delay period said bias system volume rate of increase is less than said limited volume flow rate so bias system pressure equals regulated bias supply pressure and said bias spring means increasing said engagement pressure from any higher intermediate pressure at said low rate to higher values which at the end of the trimming time period and at full bias supply and system pressure is maximum engagement pressure and on completion of said trimming time period said bias spring means increasing engagement pressure to said high source pressure.

5. In a drive and drive engagement control: fluid pressure engaged drive establishing friction means operative in response to engagement pressure for engaging to establish a drive; a source of fluid pressure; control means selectively supplying fluid from said source to said friction means for drive engagement; bias fluid supply means having volume flow-rate means providing bias fluid supply flow to meet volume flow-rate requirements up to a predetermined limited volume flow rate and having torque demand pressure regulator means operative when said predetermined limited volume flow rate is greater than the volume flow-rate requirements to regulate bias pressure increasing from a minimum to a maximum proportional to torque demand from idle to full torque demand and operative when said predetermined limited volume flow rate is less than the volume flow-rate requirements to provide said predetermined limited volume flow rate at substantially said minimum bias pressure; trimmer regulator valve means connected to said friction means and having biasing means and operative in response to said control means supplying fluid pressure from said source to said friction means for drive engagement for regulating the engagement pressure in said friction means to increase at a low rate relative to time over a predetermined trimming time period and having variable volume bias means openly connected to said bias fluid supply means to supply bias fluid to said variable volume bias means to provide variable bias pressure in said variable volume bias means controlled by change of volume responsive to said bias means and bias pressure operative in response to said control means supplying fluid pressure from said source to said friction means to drive engagement at idle torque demand to provide a change of volume of said bias means providing minimum bias pressure for controlling the engaging pressure in said friction means to provide at idle torque demand an initial minimum engagement pressure permitting slip at minimum idle drive torque and increasing the engagement pressure at a low rate relative to time over said predetermined trimming time period to an intermediate engagement pressure providing non-slip drive at maximum idle drive torque and at higher to full torque demand said variable volume bias means in response to said control means supplying fluid pressure from said source to said friction means and said bias fluid supply means supplying bias fluid flow to said variable volume bias means increasing said variable volume at a high rate greater than, so volume flow-rate requirements are greater than, said predetermined limited volume flow rate to reduce said bias pressure substantially to said minimum bias pressure providing substantially said initial minimum engagement pressure at all torque demand values and then increasing said variable volume at a lower rate approaching less than said predetermined limited volume flow rate so bias pressure and the engagement pressure increase at a higher rate relative to time and to higher values proportional to torque demand in a significant large initial portion of said predetermined trimming time period and then from said higher values reducing the rate of increase of volume of said variable volume bias means to substantially less than said predetermined limited volume flow rate to provide bias pressure proportional to torque demand and engagement pressure proportional to torque demand and increasing at said low rate to a maximum engagement pressure at the end of said trimming time period providing non-slip drive at higher to full drive torque.

* * * * *

UNITED STATES PATENT AND TRADEMARK OFFICE
CERTIFICATE OF CORRECTION

PATENT NO. : 4,036,083
DATED : July 19, 1977
INVENTOR(S) : Ted M. McQuinn

It is certified that error appears in the above-identified patent and that said Letters Patent are hereby corrected as shown below:

Column 1, line 24, after "drive" insert -- , a drive --.
          line 66, change "valves" to -- values --.

Column 4, line 14, change "52b" to -- 52a --.
          line 36, change "58" to -- 48 --.
          line 44, delete "the modulator 33,"

Column 10, line 46, after "engagement" insert -- pressure --.

Column 11, line 48, after "said" insert -- one --.
           line 53, change "increasing" to -- increase --.

Column 14, line 3, before "period" insert -- time --.
           line 33, before "control" insert -- shift --.

Column 16, line 8, change "to" (2nd occur.) to -- for --.

Signed and Sealed this

Third Day of January 1978

[SEAL]

Attest:

RUTH C. MASON
*Attesting Officer*

LUTRELLE F. PARKER
*Acting Commissioner of Patents and Trademarks*